Aug. 7, 1962 T. E. DAVIS 3,048,779
DIODE IMPEDANCE TESTER
Filed April 9, 1959
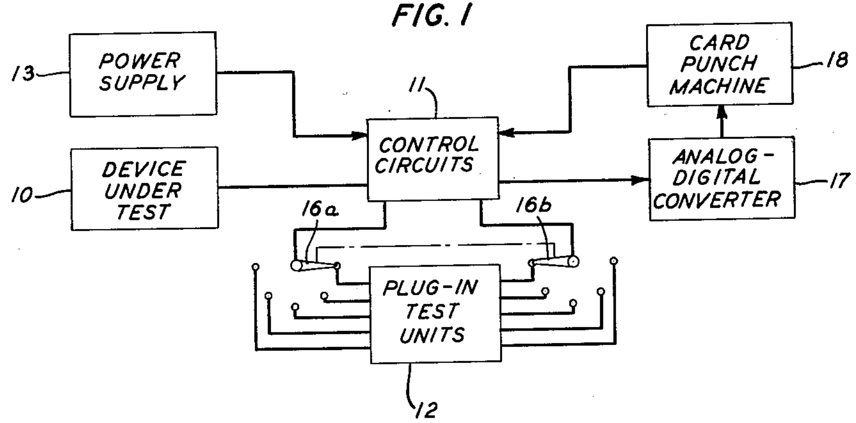
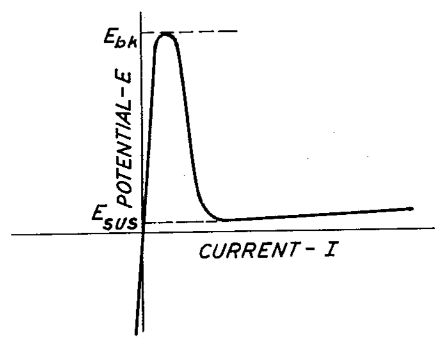
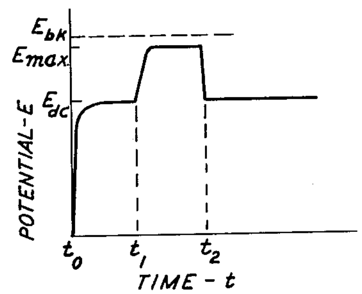
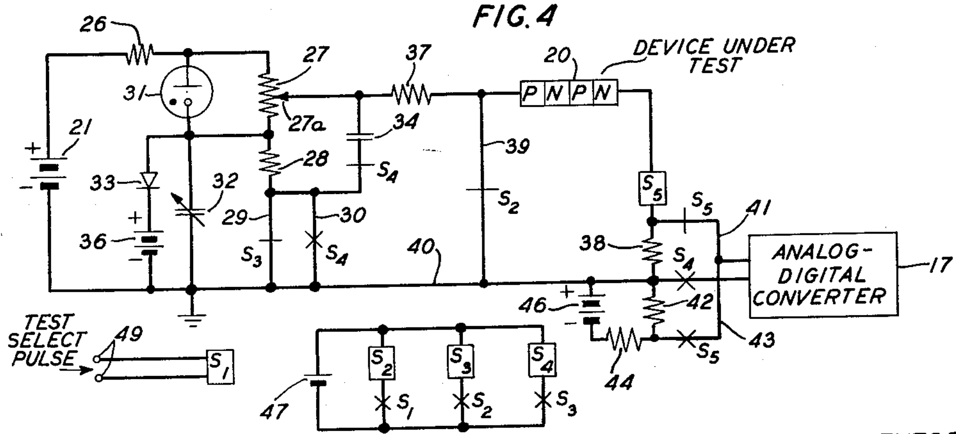
INVENTOR
T. E. DAVIS
BY
Charles Scott Phelan
ATTORNEY 3,048,779

DIODE IMPEDANCE TESTER

Thomas E. Davis, Metuchen, N.J., assignor to Bell Telephone Laboratories, Incorporated, New York, N.Y., a corporation of New York Filed Apr. 9, 1959, Ser. No. 805,233
11 Claims. (Cl. 324—158)

This invention relates to a testing circuit for semiconductor devices. More particularly the invention relates to a testing circuit which can perform two discrete tests rapidly and in one operation.

PNPN semiconductor diodes have been developed and are described as to structure, characteristics, and certain applications in the United States Patent 2,855,524 which issued October 7, 1958, to W. Shockley. One application of these diodes comprises the use thereof as crosspoint switches in telephone switching systems. Crosspoint switches, as is well known in the art, are employed for interconnecting a signal input terminal with one of a plurality of output terminals so that upon the actuation of a selected crosspoint switch the input terminal will be electrically connected to the one output terminal corresponding to the selected switch. In the past, electromagnetic relays have generally been employed for crosspoint switching purposes. However, the use of diode switches is becoming increasingly popular for this purpose.

In order to obtain reliable switching with crosspoint diode switches, the diode characteristics must conform to certain requirements. Each diode must have a forward impedance before breakdown, Off-current impedance, of a predetermined minimum magnitude and a forward breakdown voltage lying within a predetermined voltage range. These two requirements, and others, assure reliable switching characteristics, and they further assure that the switching system will not be plagued by objectionable energy transmission between crosspoint network terminals that are coupled only by unactuated diode switches.

Consequently, it is desirable to measure the diode impedance at a certain current level prior to breakdown. The certain level corresponds to the level at which leakage currents might be expected to flow in the diode during normal operation of a particular crosspoint network. In addition, it is desirable to know what the likelihood is that a particular diode may be prematurely switched On by noise impulses of a certain magnitude while carrying the above-mentioned leakage currents. The problem of determining these two characteristics of a semiconductor diode is complicated by the necessity for testing large quantities of production diodes in comparatively short periods of time.

Accordingly, this invention contemplates a test circuit suitable for use in connection with an automatic test system for determining in one operation, two characteristics of a semiconductor device.

It is one object of the invention to measure the characteristics of a semiconductor device in a rapid manner.

It is another object to combine in one operation more than one test process.

A further object is to determine the Off-current impedance of a semiconductor diode.

An additional object is to determine the resistance of a semiconductor diode to noise-pulse triggering.

These and other objects of the invention are realized in an illustrative embodiment in which a unique combination of a potential dividing circuit and switching relays enables the application to a device under test of a direct voltage and a superimposed simulated noise pulse followed automatically by either a measurement of diode current or an indication that diode breakdown has occurred.

It is one feature of the invention that no special timing devices are required for simulating a noise pulse. The usually troublesome inherent delay in the operation of an electromagnetic relay is employed to advantage in the invention to facilitate the production at a desired time of a simulated noise pulse.

Additional objects and features of the invention will become apparent upon a consideration of the following specification and the drawing, in which:

FIG. 1 is a simplified block and line diagram of an automatic testing system for diodes, which system may employ a test circuit in accordance with the invention;

FIG. 2 is an illustration of a typical potential versus current characteristic of a PNPN crosspoint diode;

FIG. 3 is a potential versus time waveform of the transient voltages applied to a diode under test in accordance with the invention; and FIG. 4 is a schematic diagram of a diode testing circuit in accordance with the invention.

Referring to FIG. 1, a device 10 under test is coupled for testing purposes through control circuits 11 to one of a plurality of plug-in test units 12. Operating potential is supplied to control circuits 11 and to the plug-in test units 12 from a power supply 13. Selector switches 16*a* and 16*b* are operated by control circuits 11 in a predetermined sequence for selecting different ones of the plug-in test units 12 to measure different characteristics of the device 10. Upon the completion of a test an analog voltage representing the measured characteristic of the device is coupled from the selected test unit through control circuits 11 to an analog-digital converter 17. The digital version of the test voltage is then applied from the converter 17 to a suitable indicating device such as a card punch machine 18. Machine 18 records the magnitude of the digital voltage and then signals control circuits 11 that the recording operation has been completed. Control circuits 11 actuate switches 16*a* and 16*b* to select a new plug-in test unit, and the operation is repeated to determine an additional item of information about the device under test and to record the information. Automatic systems for measuring electrical characteristics and recording the results as just described are well known and have been employed, for example, in the production testing of complex circuits and of resistors.

A typical voltage versus current characteristic for a semiconductor PNPN crosspoint diode which may be tested in a system such as that illustrated in FIG. 1 is shown in FIG. 2. As the forward bias voltage is increased from zero, the diode displays a high forward impedance until the applied forward bias potential exceeds the diode forward breakdown voltage which is indicated in FIG. 2 by the broken line designated $E_{bk}$. At the breakdown point the slope of the characteristic changes from positive to negative, and the diode enters its unstable negative resistance region and passes to its low impedance condition. In the low impedance condition, the diode conducts at a relatively high level, compared to the conduction level in the high impedance condition, as long as a predetermined minimum sustaining voltage $E_{sus}$ is maintained. If the diode voltage falls below the sustaining voltage, the diode is immediately restored to its high impedance condition with substantially no current flowing therethrough. For a typical crosspoint diode, the forward breakdown voltage may be of the order of 50 volts, and the sustaining voltage may be of the order of 5 volts.

Referring to FIG. 3, the waveform of the voltage applied to a crosspoint diode undergoing test in accordance with the invention is shown. This waveform is not drawn to scale, and in particular the time scale for the waveform has been expanded in order to facilitate illustration. The significance of the waveform will be subsequently discussed. Briefly, however, at time $t_0$ a direct potential which rapidly attains a level $E_{dc}$ is applied to the device under test. At time $t_1$ a simulated noise pulse is superimposed on the voltage $E_{dc}$. At time $t_2$ the noise pulse is terminated, and the steady direct potential $E_{dc}$ remains. Both the maximum attained potential $E_{max}$ and the steady direct potential $E_{dc}$ are greater than the diode sustaining voltage $E_{sus}$ and less than the diode breakdown voltage $E_{bk}$.

Referring to FIG. 4, there is illustrated a schematic diagram of the test circuit in accordance with the invention. The detached contact method of illustration has been employed to show electromagnetic relays and their associated contacts. Accordingly, the operative coils of the relays are illustrated separately from their respective contacts, but the operating coils and their contacts bear the same reference characters. Normally open contacts are schematically represented by a cross mark on the connection which they control, and normally closed contacts are schematically represented by a single short line perpendicular to and crossing the connection which they control.

The circuit of FIG. 4 comprises a plug-in test unit which may be one of the several units 12 hereinbefore mentioned in connection with FIG. 1. A PNPN crosspoint diode 20 is the device under test. Operating potential for the test is supplied from a battery 21 which has the negative terminal thereof connected to ground. If the test circuit is employed as a part of the testing system illustrated in FIG. 1, the function of battery 21, and the functions of other batteries illustrated in FIG. 4, would be performed by power supply 13 via connections in control circuits 11. A potential dividing circuit is connected between the terminals of battery 21 and includes in series in the order named resistor 26, potentiometer 27, resistor 28, and a low impedance switching circuit including two branch circuits 29 and 30 connected between resistor 28 and ground. Branch circuit 29 comprises a set of normally closed contacts of a relay S3, and branch circuit 30 includes a set of normally open contacts of a relay S4.

A voltage regulator tube 31 is connected in shunt with the fixed resistance portion of potentiometer 27 for maintaining a uniform potential difference thereacross. A variable capacitor 32 is connected in shunt with respect to the series combination of resistor 28 and the branch circuits 29 and 30. A voltage limiting circuit comprising the series combination of a reversely biased diode 33 and a biasing battery 36 therefore is connected in parallel with capacitor 32.

A capacitor 34 in series with a set of normally closed contacts of relay S4 shunts resistor 28 and the portion of potentiometer 27 between resistor 28 and a tap 27*a* on potentiometer 27. Capacitor 34, and the combined resistances of resistors 26 and 28 and of potentiometer 27, control the slope of the transient when $E_{dc}$ is applied to diode 20 as hereinafter described. Resistor 28 is assigned a resistance which is much smaller than the resistance of the portion of the potentiometer 27 between tap 27*a* and resistor 28. Thus resistor 28 provides a relatively low impedance dissipation path for energy stored in capacitor 32, and at the same time it does not make a significant contribution to the magnitude of the potential difference between tap 27*a* and ground. Capacitor 32 is the principal element controlling the slope of the leading edge of the simulated noise pulse.

A series circuit including the diode 20 under test is connected between tap 27*a* and a ground bus 40 and includes a current limiting resistor 37, the operating coil of a relay S5, and a current sensing resistor 38. In the testing system of FIG. 1, the diode 20 would be connected in the last-mentioned series circuit via connections in control circuits 11. A low impedance shunt 39, including normally closed contacts of a relay S2, is connected in parallel with the series combination of diode 20, relay S5, and resistor 38. Relay S5 is an overcurrent relay which is responsive to currents corresponding in magnitude to currents in diode 20 in its low impedance condition.

The ground bus 40 is connected to one terminal of the analog-digital converter 17 via a set of normally open contacts of relay S4. The converter 17 has the other terminal thereof connected to the ungrounded terminal of resistor 38 via a connection 41 which includes a set of normally closed contacts of relay S5. Resistor 38, acting as a current-responsive device, develops a potential which is proportional to the current in diode 20 for actuating converter 17. Converter 17 is also connectable across a resistance 42 via ground bus 40 and a connection 43 which includes a set of normally open contacts of relay S5. A battery 46, with the positive terminal thereof grounded, is connected in series with a resistor 44 across resistor 42. Comparing the polarities of batteries 21 and 46, it will be noted that converter 17 is activated by a voltage of one polarity when connected across resistor 38 and by a voltage of the opposite polarity when connected across resistor 42. The connections 41 and 43, and the ground connection via contacts S4, would, in the system of FIG. 1, be provided in control circuits 11.

The operating coils of three relays S2, S3, and S4 are connected in a chain between the terminals of a further battery 47. A relay S1 is provided with terminals 49, 49 for receiving test select pulses from control circuits 11 of FIG. 1. Relay S1 is provided with a set of normally open contacts connected in series with the operating coil relay S2, and relays S2 and S3 are provided with normally open contacts connected in series with the operating coils of relays S3 and S4, respectively. At least the relays S3 and S4 are characterized by a slight time lag between the application of a voltage to the operating coil thereof and the actuation of the contacts thereof to their operated conditions. This time lag which is objectionable in some circuit applications, is utilized to advantage as hereinafter described. A suitable relay for this purpose would be a mercury contact relay which is well known in the art and which has an operating time which is of the order of one millisecond with no contact chatter.

Considering the operation of the test circuit illustrated in FIG. 4, prior to the application of a test select pulse to terminals 49, 49, all of the relays S1 through S5 stand unoperated with their contacts in their respective normal conditions. Substantially zero potential is applied to diode 20 because it is short circuited by shunt 39. Current from battery 21 flows through resistor 26, potential divider 27, resistor 28, and branch circuit 29 to ground. Voltage regulator tube 31 is conducting; diode 33 is not conducting; capacitor 34 is charged to the potential difference between tap 27*a* and ground; and capacitor 32 is charged to the relatively small potential difference across resistor 28.

Tap 27*a* is set to apply to diode 20 a predetermined potential corresponding to the steady-state direct potential $E_{dc}$ indicated in FIG. 3. Capacitor 32 is adjusted to fix the slope of the simulated noise pulse leading edge to correspond to typical real noise pulses. Converter 17 may be held nonresponsive to input potentials by control circuits 11 if the circuit of FIG. 4 is employed in an automatic test system. The latter operation is schematically represented in FIG. 4 by the normally open contacts for relay S4 in the connection from bus 40 to converter 17.

A test select pulse applied to terminals 49, 49 from control circuits 11 actuates relay S1 thereby closing contacts S1 in series with the operating coil relay S2. Subsequently, relay S2 closes its contacts S2 in series with the operating coil of relay S3 and opens its contacts S2 in the shunt 39. The opening of shunt 39 occurs at time $t_0$ and causes the potential at tap 27*a* to be applied to the series circuit including diode 20. The direct potential applied to diode 20 increases to the level $E_{dc}$ with a finite positive slope due to the time required to change the charge on capacitor 34.

The elapsed time between times $t_0$ and $t_1$ corresponds to the inherent delay in the operation of relay S3 after the closing of the contacts S2 in series with the operating coil thereof as hereinbefore noted. At time $t_1$, after the voltage $E_{dc}$ has been attained, the contacts S3 in series with the operating coil of relay S4 are closed and the contacts S3 in branch circuit 29 are opened. Upon the opening of branch circuit 29, capacitor 32 begins to charge toward the potential of battery 21. As capacitor 32 charges, the potential, with respect to ground of tap 27*a*, increases in a similar manner thereby increasing the potential applied to diode 20. Current flowing through the fixed resistance portion of potentiometer 27 does not change during the charging of capacitor 32 since the increased current flow represented by the charging current in capacitor 32 is carried by regulator tube 31. Diode 33 and battery 36 are arranged to conduct upon the attainment across capacitor 32 of a predetermined maximum potential such that the total potential difference $E_{max}$ across diode 20 attains the desired maximum testing magnitude which is somewhat less than the magnitude of the desired diode breakdown voltage.

The time delay from $t_0$ to $t_1$ after the application of the direct current voltage and before the application of the simulated noise pulse represents actual field conditions for a crosspoint diode. In a crosspoint network the diode normally rests with about half of its breakdown voltage, corresponding to $E_{dc}$, applied thereto. The selection of other crosspoints causes the diode potential to increase, in the manner of the simulated noise pulse illustrated in FIG. 3, to a magnitude, corresponding to $E_{max}$, which is less than the breakdown voltage.

At time $t_2$ the contacts S4 in branch circuit 30 are closed, and the contacts S4 in the connection between bus 40 and converter 17 are closed. Capacitor 32 discharges through resistor 28 to its initial quiescent potential thereby terminating the simulated noise pulse and reducing the voltage across diode 20 to the voltage $E_{dc}$ shown in FIG. 3. Subsequent to time $t_2$ crosspoint diode 20 is subjected to the steady direct potential $E_{dc}$.

Converter 17 responds to the potential difference applied thereto from the diode test circuit. If diode 20 has not broken down under the influence of the simulated noise pulse, relay S5 remains unoperated and the potential difference across resistor 38 is applied to converter 17 via connection 41 to produce an indication on converter 17 of the magnitude of the potential difference across resistor 38. The latter potential difference is a function of the current in diode 20 which, in turn, is a function of the Off-current impedance of diode 20. Improved accuracy in measuring the Off-current impedance of diode 20 could be realized, of course, by open-circuiting capacitor 34 at a convenient time to prevent it from discharging through diode 20 during the actual measuring operation. One such convenient time may be at time $t_2$ when the noise pulse is terminated.

If diode 20 breaks down under the influence of the simulated noise pulse, a defective diode is indicated. The resultant sharp increase in current through the diode circuit actuates relay S5 to open the contacts in connection 41 and to close the contacts in connection 43. A negative potential is now applied to the input of converter 17 thereby producing an indication for record of a completely different character, opposite polarity, than any indication that would be produced for a diode that did not break down. The connection of converter 17 to operate in response to potentials of different polarities is useful for providing completely different digital signals to the card punch machine 18 for good diodes and for defective diodes thereby facilitating the selection from a large group of indicator cards, those cards which are associated with defective diodes.

Upon the termination of the test select pulse, all of the relays S1 through S5 are released. The circuit of FIG. 4 is restored to its original quiescent condition.

In summary, the test circuit of FIG. 4 is responsive to a single test select pulse for determining both the diode Off-current impedance and the breakdown resistance of a diode in the presence of noise pulses. The diode impedance is a function of the potential difference across resistor 38 which is applied to converter 17. A satisfactory breakdown resistance is indicated by a positive potential difference indication on converter 17, and an unsatisfactory breakdown resistance is indicated by a negative potential difference indication on converter 17. The two tests, Off-current impedance and resistance to noise breakdown, are performed in a single test operation.

To set up the circuit initially for testing purposes, tap 27*a* is adjusted for the desired value of $E_{dc}$, battery 36 is selected for the desired maximum test voltage $E_{max}$, and capacitor 32 is adjusted for the desired noise pulse slope. Once these adjustments have been made, many diodes can be tested rapidly, and the test to which each diode is subjected will be exactly the same as the test applied to each other diode. By employing well known relay switching techniques, the connections for diode 20 and converter 17 can be shifted rapidly from one test unit to the next to perfom different tests on the same diode. In like manner, well known material handling techniques may be employed for successively bringing a large number of diodes into a position where they may be subjected to the same series of tests.

Although this invention has been described with respect to a particular embodiment thereof as applied to the testing of a particular device, it is to be understood that other embodiments and applications which will be obvious to those skilled in the art are included within the spirit and scope of the invention.

What is claimed is:

1. A circuit for testing in one operation the OFF-current impedance and the resistance to noise breakdown of a diode which is characterized by a high current flow with a small applied voltage after a larger critical voltage, the breakdown voltage, has been exceeded, said circuit comprising a potential divider for applying to said diode a known direct voltage, means for superimposing upon said direct voltage in an additive manner a voltage pulse of known maximum voltage magnitude, the total magnitude of said direct voltage and said pulse being less than said forward breakdown voltage, impedance indicating means having a predetermined range of indications, and means responsive to current in said diode for actuating said indicating means, impedance indications in a first portion of said range being diode OFF-current impedances and impedance indications in a second portion of said range indicating diode breakdown.

2. A circuit for testing a semiconductor diode having a nonlinear voltage versus current characteristic with a low current conduction portion and a high current conduction portion, said circuit comprising a source of a known direct voltage, means for applying said direct voltage to said diode, means for superimposing upon said direct voltage in an additive manner a voltage pulse of the same polarity as said direct voltage and of known maximum voltage magnitude, the total magnitude of said direct voltage and said pulse being less than the forward breakdown voltage of said diode, indicating means, first current responsive means connected to said diode for actuating said indicating means with a first polarity in proportion to diode current, and second current responsive means connected to said diode and actuatable by only those diode currents which are substantially equal to diode current in said high conduction condition for actuating said indicating means with the opposite polarity.

3. A circuit for testing a semiconductor diode, said circuit comprising a source of direct potential, a resistance connected between the terminals of said source and having an intermediate tap thereon, means for connecting said diode between said tap and one terminal of said source in a circuit which operatively shunts a portion of said resistance, switching means having contacts connected in series with said resistance between said resistance and said one terminal of said source, said switching means being operatable for opening and closing the connection between said resistance and said one terminal, and means connected to said diode connecting means for indicating the magnitude of current in said diode.

4. A circuit for testing a semiconductor diode, said circuit comprising a source of direct potential, first and second resistances connected in a series circuit between the terminals of said source, said first resistance having an intermediate tap thereon, means for connecting said diode between said tap and one terminal of said source in a circuit which shunts said second resistance and a portion of said first resistance, switching means having contacts connected to said second resistance for opening and closing said series circuit, a capacitor connected in shunt with said second resistance and said contacts, and means connected to said diode connecting means for indicating the magnitude of current in said diode.

5. The diode testing circuit in accordance with claim 4 in which a limiter circuit is connected in shunt with said capacitor for restricting the maximum potential applied to said diode.

6. A circuit for testing a semiconductor diode which is characterized by a condition of high forward current flow and a condition of low forward current flow, said testing circuit comprising a source of direct potential, first and second resistances connected in a series circuit between the terminals of said source, said first resistance having an adjustable tap thereon, means for connecting said diode between said tap and one terminal of said source in a circuit which shunts said second resistance and a portion of said first resistance, a voltage regulator connected in shunt with said first resistance, switching means having contacts connected in series with said second resistance for first opening and then closing said series circuit in response to a single applied test pulse, voltage limiting means connected in shunt with the series combination of said second resistor and said contacts for restricting the maximum potential applied to said diode, means for applying a test pulse to said switching means, and means connected to said diode connecting means for indicating the impedance of said diode as a function of the current therein.

7. The testing circuit in accordance with claim 6 in which a variable capacitor is connected in parallel with said limiting means for controlling the rate of voltage change upon the opening of said series circuit.

8. The testing circuit in accordance with claim 6 which comprises in addition an overcurrent relay operative in response to currents of magnitudes corresponding to diode current magnitudes in said condition of high forward current flow, a third resistor, means for connecting said overcurrent relay and said third resistor in series with said diode in said diode connecting means, an input circuit for said indicating means, a second source of direct potential, means for connecting said input circuit across said third resistor, and means responsive to the operation of said overcurrent relay for switching said input circuit from said third resistor to said second source of direct potential for reversing the polarity of the indication on said indicating means.

9. The testing circuit in accordance with claim 6 in which a low impedance circuit is connected in shunt with a portion of said diode connecting means including said diode, and said switching means includes a switching section connected in series with said second resistance in said series circuit, said switching section comprising two low impedance branch circuits, a plurality of relays arranged for sequential operation in response to the operation of a first one of said relays, said first relay having normally closed contacts in said low impedance shunt circuit, a second one of said relays having in one of said branch circuits contacts which are normally closed when said second relay is inoperative, and a third one of said relays having in the other one of said branch circuits contacts which are normally open when said third relay is inoperative, and means for applying said test pulse to said first relay for operating said relays.

10. The testing circuit in accordance with claim 9 in which a capacitor is connected in shunt with the series combination of said second resistance and said portion of said first resistance for fixing the rate of voltage change at said diode upon the opening of said normally closed contacts in said low impedance shunt circuit.

11. A circuit for testing the impedance of semiconductor crosspoint diodes which are characterized by an electric-conduction-sustaining voltage and by a substantially larger breakdown voltage which must be exceeded before conduction can begin, said circuit comprising means for applying to a diode under test a direct potential of a magnitude which is less than said breakdown voltage but greater than said sustaining voltage, said applying means comprising a battery and a potential divider connected between the terminals of said battery, pulse-responsive switching means having contacts connected in series with said potential divider, means for superimposing upon said direct potential a simulated noise voltage pulse having a predetermined magnitude, the total magnitude of said direct potential and said simulated noise voltage pulse being less than said breakdown voltage, the last-mentioned means comprising said contacts, a capacitor, means for connecting said capacitor in parallel with said contacts and a portion of said potential divider, and means connected between the terminals of said capacitor for limiting the potential across said capacitor to a magnitude which is equal to said noise pulse magnitude, means connecting said diode in a circuit which shunts said portion, said contacts, and an additional portion of said potential divider, means for applying a pulse to said switching means for operating said contacts to open-circuit said potential divider for a predetermined portion of the duration of the last-mentioned pulse, and means in the last-mentioned circuit for indicating the impedance of said diode in response to the current flowing therein.

References Cited in the file of this patent

UNITED STATES PATENTS

| | | |
|---|---|---|
| 2,585,353 | Strum | Feb. 12, 1952 |
| 2,743,420 | Haldeman | Apr. 24, 1956 |

OTHER REFERENCES

Firle et al.: "Proceedings of the I.R.E.," May 1955; pages 603–607.